United States Patent

Wischermann

[11] Patent Number: 5,298,880
[45] Date of Patent: Mar. 29, 1994

US005298880A

[54] ELECTRONIC CONTROL DEVICE

[75] Inventor: Josef Wischermann, Dreimuehlenstrasse 38, 8000 Muenchen 5, Fed. Rep. of Germany

[73] Assignees: Michel Blanchard; Josef Wischermann, both of Munich, Fed. Rep. of Germany; a part interest

[21] Appl. No.: 878,501

[22] Filed: May 5, 1992

[30] Foreign Application Priority Data

Jun. 10, 1991 [DE] Fed. Rep. of Germany ... 9107128[U]

[51] Int. Cl.$^5$ .............................................. B60Q 1/00
[52] U.S. Cl. .................................. 340/439; 340/461; 340/459; 340/521
[58] Field of Search ................ 340/459, 461, 521, 439

[56] References Cited

U.S. PATENT DOCUMENTS

| 4,344,136 | 8/1982 | Panik | 340/459 |
| 4,409,832 | 10/1983 | Konjedic et al. | 340/459 |
| 4,447,801 | 5/1984 | Masuda | 340/459 |
| 4,890,088 | 12/1989 | Woodell | 340/459 |

Primary Examiner—Donnie L. Crosland
Attorney, Agent, or Firm—Fisher & Associates

[57] ABSTRACT

An electronic control device capable of responding to at least two work parameters of an internal combustion engine for activating a warning device which includes at least two work parameter sensor switches and a warning device electrically connected to the parameter sensor switches in such a manner that a small excess over a given threshold value of a work parameter in the sensor switches activates the warning device.

4 Claims, 1 Drawing Sheet

ELECTRONIC CONTROL DEVICE

BACKGROUND OF THE INVENTION

1. Field of the Invention

The present invention relates generally to an electronic control device associated with an internal combustion engine, and more particularly to an electronic control device which responds to at least two work parameters of an internal combustion engine.

2. Description of the Prior Art

Customarily, motor vehicles having internal combustion engines are equipped with controls which respond to various work parameters of the engines. Such controls usually function in such a manner that a sensor monitors a work parameter when the engine is running, and an indication of the parameter is either shown in a continuous display Or otherwise. In the usual case, there is only one display occurring in response to the work parameter exceeding a given threshold value. Internal combustion engines are commonly provided with a warning light that goes on when the oil pressure reaches an unacceptable low value. Furthermore, it has been common practice in motor vehicles having water-cooled internal combustion engines to provide an indicator for the cooling water temperature. For this purpose, a sensor is used to measure the cooling water temperature which is generally displayed by way of an analog display instrument. In a large number of motor vehicles, the temperature sensor is connected with a thermostat which activates a fan to further assist the cooling water control mechanism.

The engine temperature and the cooling water temperature are parameters which can only be changed very slowly over a long period of time. Therefore, the possibility exists that the exceeding of a given maximum temperature can take place unnoticed, due to the fact that the driver cannot detect or pay attention to a steady increase in the temperature. As a result of this situation, there is the possibility of irreparable damage to the engine after a long period of operation at unacceptably high temperatures, even though the excess over the threshold value for the cooled water temperature or the engine temperature was correctly indicated.

Another possible cause for the unnoticed passing of a permissible threshold value of a work parameter in an internal combustion engine, especially in today's motor vehicles, is the fact that the vehicle operator is under intense stress resulting from heavy traffic for long periods of time, and cannot pay attention to the indicators on the dashboard. Furthermore, the operator of a motor vehicle can be in a special situation, such as driving through a construction site on an expressway, or having to encounter many traffic lights and a variety of traffic signs which may expose the driver to a high level of irritation, resulting in the driver's not paying attention to the optical indicators on the dashboard.

There is a further possibility that a standard thermostat for measuring cooling water temperature may break down, leading to a simultaneous failure of the cooling water temperature indicator. In such a case, the exceeding of the permissible threshold temperature is not shown, which can also lead to damage to the engine.

SUMMARY OF THE INVENTION

It is therefore an object of the present invention to provide an electronic control device constructed in such a way as to achieve a reliable response to work parameters of an internal combustion engine.

A further object of this invention is to provide a control device capable of responding to at least two work parameters of an internal combustion engine in response to at least two sensor switches which are connected electrically to a warning mechanism, wherein the exceeding of an allowable threshold value of a given parameter immediately actuates a warning mechanism in response to the corresponding sensor switch.

A further object of this invention is to provide a single central warning mechanism responding to a control device which will reliably attract the attention of a motor vehicle operator and direct the operator to the source of the problem.

A further object of this invention is to provide an electronic control device which responds to at least two work parameters of an internal combustion engine by giving an acoustic signal which the operator of a motor vehicle is capable of listening to without the necessity of a visual indicator.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
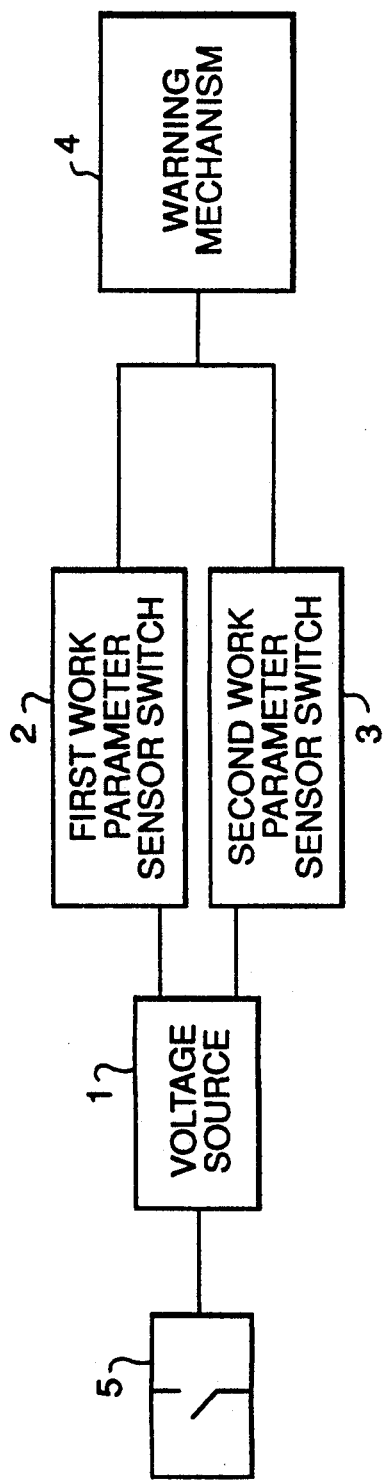
FIG. 1 is a block circuit diagram of the warning mechanism of the present invention.

With reference to the figures, wherein like reference characters indicate like elements throughout the several views and, in particular, with reference to FIG. 1, wherein there is shown a schematic block diagram of the functions of the electronic control device of the present invention. The electronic control device has a voltage source 1, a first work parameter sensor switch 2, a second work parameter sensor switch 3, a warning mechanism 4, and a switch mechanism 5. The switch mechanism 5 is actuated during both the starting and the stopping of the internal combustion engine. When the engine is switched on, the necessary voltage supply for the control mechanism is provided by the voltage source 1 which, in turn, guarantees that the control mechanism only functions with the engine running, thus preventing the appearance of problem signs on the indicator when the engine is turned off. This is necessary since some values of the work parameters that appear when the engine is turned off could be unacceptable for a running engine. Furthermore, by operating in this manner, it is possible to eliminate any unnecessary consumption of energy.

When the control mechanism is activated in the described manner, the work parameter sensor switches 2, 3 control in an uninterrupted manner the corresponding work parameters. These parameters are, for example, the oil pressure and the cooling water temperature. If at least one of the working parameter sensors 2, 3 detects the overstepping of the corresponding threshold value, then there will be a signal to the warning mechanism 4. The signal will switch-on the warning mechanism and, automatically, will issue a warning signal that will be definitely observed by a motor vehicle operator.

Figure 2:
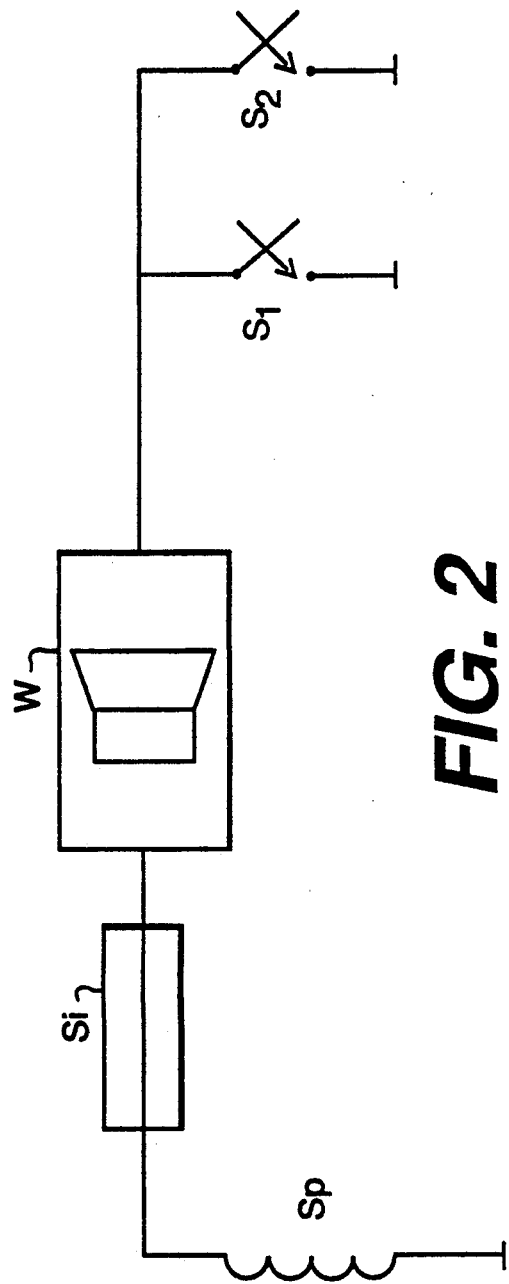
FIG. 2 is an electrical circuit diagram of the warning mechanism of the present invention.

FIG. 2 shows the electrical circuit diagram of a preferred embodiment, wherein the circuit includes a primary coil Sp of an ignition unit, a safety switch Si, a warning device with acoustic output W, a water temperature sensitive switch S1, and an oil pressure switch S2.

The moment the internal combustion engine is turned on, there will be a voltage supplied across the junctions of the primary coil Sp. After starting, the oil pressure usually takes a short but measurable time to reach the desired value, such that the corresponding oil pressure switch S2 will be closed, establishing an electrical connection for the switch ground. In this manner, a closed circuit exists from the primary coil Sp, through the safety switch Si, the warning mechanism W, the oil pressure switch S2, and a switch ground, which is also connected with a primary coil. This situation will automatically result in an acoustic signal from the warning mechanism W. As soon as the oil pressure has reached an acceptable value, the switch S2 opens, and this results in the switching-off of the warning device W. According to this method, during the starting stage, there is a signal alerting the operator of the motor vehicle that the control mechanism is operating in a reliable fashion.

Parallel to the oil pressure switch S2, there is a temperature sensitive switch S1, with both switches being located between the warning mechanism W and the circuit ground. For example, if switch S1 controls the cooling water temperature, in a cold engine, and as long as the cooling water temperature does not exceed a threshold value of, for example, 95 degrees C., switch S1 is opened. This means that in a problem-free operation of the internal combustion engine, there will be no signal given by the warning mechanism W. However, if during the operation of the motor vehicle any one of the two work parameters have a threshold value which is exceeded, one of the two switches S1 or S2 will be closed. This will result in an automatic activation of the warning mechanism. From the design of this circuit, it is self-evident that, in the event that both working parameters simultaneously surpass their allowable threshold values, the control device guarantees that there will be a warning signal.

Any overload of the circuit will be prevented by way of a safety switch Si, which will force the interruption of the current, which could create a further problem, such as the burning of cables.

The warning mechanism W is preferably built as an acoustical device which could be mounted in the interior of a motor vehicle so as to easily call to the attention of the operator any unacceptable values of the work parameters. With such a device, the operator of the motor vehicle can enjoy an unobjectionable performance from the internal combustion engine while concentrating on driving conditions. Once the operator hears the sound of the warning device, he can view a corresponding optical device to determine the source of the problem.

The temperature sensitive switch S1 can be mounted, for example, on the wall of a water hose (not shown). This can be achieved by making an opening in the wall of the water hose and forming a water-tight seal with a binder used to secure the sensor switch to the hose. The sensor switch would be installed parallel to the oil pressure switch, which is commonly found in most motor vehicles, and could also be connected with the warning mechanism W installed on the inside of the motor vehicle. This assembly can be easily and reliably installed by a motor vehicle mechanic such that the invention would be suitable for the improvement of any type of existing motor vehicle.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An electronic control and acoustic warning device capable of responding to at least two work parameters of an internal combustion engine, said internal combustion engine having an ignition unit which connects said electronic control and acoustic device to a voltage source upon starting of said internal combustion engine, said internal combustion engine having a predetermined operating range, the limits of which define threshold values for said parameters, respectively, said electronic control and acoustic warning device comprising:

a first work parameter sensor switch for detecting said first work parameter, said first work parameter sensor switch having a first end connected to electrical ground, said first work parameter sensor switch being in a closed position when said first work parameter is below said respective threshold value;

a second work parameter sensor switch for detecting said second work parameter, said first and second work parameter sensor switches disposed electrically parallel to each other, said second work parameter switch having a first end connected to electrical ground, said second work parameter sensor switch being in a closed position when said second work parameter is above said respective threshold value;

said ignition unit comprising at least a primary coil, said primary coil connected in series with second ends of said first and second work parameter sensor switches, respectively; and an acoustic warning device disposed in series between said primary coil and said second ends of said first and second work parameter switches, said acoustic warning device generating an audible warning when either of said first or second work parameter sensor switches are in a closed state.

2. An electronic control device according to claim 1, wherein one of said work parameter sensor switches is an oil pressure switch.

3. An electronic control device according to claim 2, wherein the other of said work parameter sensor switches is a cooling water temperature switch.

4. An electronic control device according to claim 3, wherein said cooling water temperature switch is attached to a cooling water hose.

* * * * *